US008619388B2

(12) United States Patent
Karis et al.

(10) Patent No.: US 8,619,388 B2
(45) Date of Patent: Dec. 31, 2013

(54) FLUID DYNAMIC BEARING WITH AN IMMISCIBLE FLUID BARRIER

(75) Inventors: Thomas E. Karis, Aromas, CA (US); Neal B. Schirle, Morgan Hill, CA (US); Kunihiro Shida, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 691 days.

(21) Appl. No.: 12/107,625

(22) Filed: Apr. 22, 2008

(65) Prior Publication Data

US 2009/0262461 A1 Oct. 22, 2009

(51) Int. Cl.
*G11B 17/02* (2006.01)

(52) U.S. Cl.
USPC .................................................. 360/99.08

(58) Field of Classification Search
USPC .................................................. 360/99.08
See application file for complete search history.

(56) References Cited

U.S. PATENT DOCUMENTS

| 4,111,498 | A | * | 9/1978 | Miller | 384/13 |
| 5,577,842 | A | | 11/1996 | Parsoneault et al. | |
| 5,907,456 | A | | 5/1999 | Khan et al. | |
| 5,957,589 | A | | 9/1999 | Lee et al. | |
| 6,179,472 | B1 | | 1/2001 | Gilliland et al. | |
| 6,302,586 | B1 | * | 10/2001 | Hayakawa | 384/119 |
| 6,672,766 | B2 | | 1/2004 | Nottingham et al. | |
| 7,001,074 | B2 | * | 2/2006 | Dittmer et al. | 384/107 |
| 7,131,770 | B2 | | 11/2006 | Neumann | |
| 7,137,739 | B2 | | 11/2006 | Dittmer et al. | |
| 7,679,243 | B2 | * | 3/2010 | Herndon et al. | 310/90 |
| 2007/0133103 | A1 | * | 6/2007 | Stempel et al. | 359/666 |

FOREIGN PATENT DOCUMENTS

| JP | 2004019669 | 1/2004 |
| WO | WO-96/09479 | 3/1996 |
| WO | WO-2006/118407 | 11/2006 |

OTHER PUBLICATIONS

Embedded Tech Magazine, "Ruggedized Hard Disk Drives Keep Data Safe in Harsh Environments", http://www.embeddedtechmag.com/content/view/138/121/1/1/, (Sep. 1, 2007),2 pages.
Zhang, et al., "Design of High-Speed Magnetic Fluid Bearing Spindle Motor", Magnetic, IEEE Transactions on, Publication Date: Jul. 2001, vol. 37, Issue: 4, Part 1, On pp. 2647-2650. http://www.ieeexplorer.ieee.org/search/srch/srchabstract.jsp?arnumber=951262&isnumber=20571&punumber=20&k2dockey=951262@ieeejrns&query=%28+%, (Jul. 2001),2647-2650.

* cited by examiner

*Primary Examiner* — David D Davis

(57) ABSTRACT

A fluid dynamic bearing with an immiscible fluid barrier deposited on the bearing oil is disclosed. One embodiment provides the fluid dynamic bearing having a seal gap to define a seal cavity. The seal cavity is filled with the bearing oil for lubricating the fluid dynamic bearing. The immiscible fluid is disposed on the bearing oil to prevent the bearing oil from evaporating from the seal cavity. In one embodiment, the immiscible fluid is insoluble in the bearing oil.

25 Claims, 7 Drawing Sheets

FLUID DYNAMIC BEARING WITH AN IMMISCIBLE FLUID BARRIER

TECHNICAL FIELD

The present invention relates to the field of hard disk drive development, and more particularly to resolving particulate contamination and fluid loss in a fluid dynamic bearing.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Areal densities of hard disk drives (HDD) in the past have increased at significant rates of 60 percent to more than 100 percent per year. Although this trend has slowed in the past few years to approximately 40 percent per year due to technology challenges introduction of perpendicular recording has again increased this growth rate. Areal densities today are close to 250 Gb/in2. HDDs are being used more often as digital applications in the consumer electronics industry proliferates, requiring much higher capacities and setting new expectation for lower acoustics. All of the above makes fluid dynamic bearing spindle motors attractive for minimizing non repeatable run-out (NRRO), lowering acoustical noise, and improving reliability.

Presently, the transition from ball bearing (BB) spindle motors to fluid dynamic bearings (FDB) has completed in the HDD industry. In general, by incorporating FDB motors in HDD designs higher areal densities and much faster spindle speeds are achieved for today's applications. For example, NRRO is the highest contributor to track mis-registration (TMR), thus impacting HDD performance. NRRO is also an inhibitor in achieving higher track densities. Ball bearing motors produce larger NRRO due to the mechanical contact with the inherent defects found in the geometry of the race ball interface and the lubricant film. Ball bearing spindle motors have minimized this issue with tighter tolerances and closer inspections. There is an upper limit beyond which the ball bearing design can no longer overcome the NRRO problem at the higher areal densities. Currently with ball bearings, NRRO has settled in the 0.1 micro-inch range.

By contrast, FDBs generate less NRRO due to absence of contact between the sleeve and stator. FDB designs are expected to limit NRRO in the range of 0.01 micro-inch. Other inherent properties of the FDB design are higher damping, reduced resonance, better non-operational shock resistance, greater speed control, and improved acoustics. Non-operational shock improvement is a result of a much larger area of surface-to-surface contact. Noise levels are reduced to approximately 20 dBA, since there is no contributing noise from ball bearings.

However, problems with FDBs are the contamination of the head disk enclosure with the lubrication and loss of fluid within the bearing. For example, significant oil loss is observed from server class fluid bearing disk drive motors during accelerated life tests at elevated temperature. The pathway for oil loss from the upper part of a bearing in one design type is schematically illustrated in FIG. 1. FIG. 1 depicts a sectional view of an upper motor bearing 11 showing the oil 13, the pathway 15 for oil loss through a seal gap 17, and the seal 19 that slows down the rate at which oil leaves the bearing cavity 21. Sealing the motor bearing 11 decreases the oil loss, but oil is still emitted through the required air gap 17 in the seal 19.

For example, the oil loss from a bearing during accelerated motor reliability testing is shown in FIG. 2. FIG. 2 illustrates the oil remaining in a bearing as a function of time during continuous running at elevated temperature. The bearing was tested with a seal (upper line 25) and without a seal (lower line 27).

As shown in FIG. 3, the oil 13 exits the bearing 11 by first passing across the oil-air interface 31 into the bearing cavity 21, possibly via oil-air interface instability. The oil then convects and diffuses (e.g., indicted by arrows 15) as oil mist 33 and/or oil vapor 35 out of the interstitial region of the bearing cavity 21 through the seal gap 17. As demonstrated in FIG. 2, the oil loss from the cavity can be reduced with an improved seal gap configuration. Oil loss also can be decreased through the use of a less volatile oil. However, that option is a less desirable solution since oil with lower volatility has a higher viscosity that can result in a 30% increase in power consumption and difficulty in cold starts. Thus, an improved solution would be desirable.

It is known that hydrocarbon monolayer's inhibit vaporization of water by as much as 40 or 50% in applications involving cooling water in evaporative towers. See, e.g., U.S. Pat. Nos. 4,099,915 and 4,147,658. Hydrocarbon surfactants cannot readily form a low surface tension monolayer on the surface of another hydrocarbon, so these methods have not been successfully applied to suppress oil evaporation. Since evaporation of volatile hydrocarbons such as solvents and gasoline is a recognized problem, low permeability aqueous foam has been used to cover those types of surfaces. See, e.g., U.S. Pat. Nos. 5,434,192 and 5,296,164. However, a foam will not work in the fluid bearing motor of a disk drive because of the very small annular space limitations and because foams are not stable for the long life required of magnetic storage devices. U.S. Pat. No. 5,935,276 discloses another solution that uses a soluble polymer film to inhibit the evaporation of solvents or gasoline. Although polymers increase the viscosity of the fluid bearing oil, it does not provide enough suppression of evaporation.

Thus, none of the known solutions for suppressing the evaporation of fuel or oil are sufficient to provide an integral evaporation barrier in the presence of interfacial shear flow that is present on the oil meniscus in a disk drive fluid bearing spindle motor. In contrast, the invention disclosed herein teaches that a novel immiscible fluid forms a layer on oil that prohibits the evaporation of oil, and remains intact in the presence of surface shear flow of a disk drive motor.

SUMMARY

Embodiments of a system, method, and apparatus for a low vapor pressure immiscible fluid barrier that inhibit the passage of oil across the oil-air interfaces in disk drive fluid bearings and enable the use of the lower viscosity oil in disk drive fluid bearings are disclosed. Mass transfer of oil from the bulk liquid oil into the vapor phase takes place by (1) oil molecules evaporating from the oil-air interface, or (2) collections of oil molecules being ejected from the oil-air interface as aerosol. The invention reduces mass transfer across the oil-air interface through the use of insoluble fluid.

The surface layer between the oil and the air inhibits mass transfer of the oil molecules into the vapor by presenting an additional barrier to the vaporization free energy. To reduce oil mist, the surface layer also reduces the surface elasticity. In one embodiment, nonfunctional perfluoropolyethers may be utilized. In an alternate embodiment, a narrow molecular weight fraction with a much lower vapor pressure than the fluid dynamic bearing oil may be used to provide evaporation and mist control.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for forming a fluid dynamic bearing (FDB) with a modified air-gap in particular. Although the fluid dynamic bearing is shown in a hard disk drive, it is understood that the embodiments described herein are useful in a fluid dynamic bearing regardless of whether the fluid dynamic bearing is a portion of a hard disk drive. The utilization of the fluid dynamic bearing within the HDD is only one embodiment and is provided herein merely for purposes of brevity and clarity.

Overview

Figure 5:
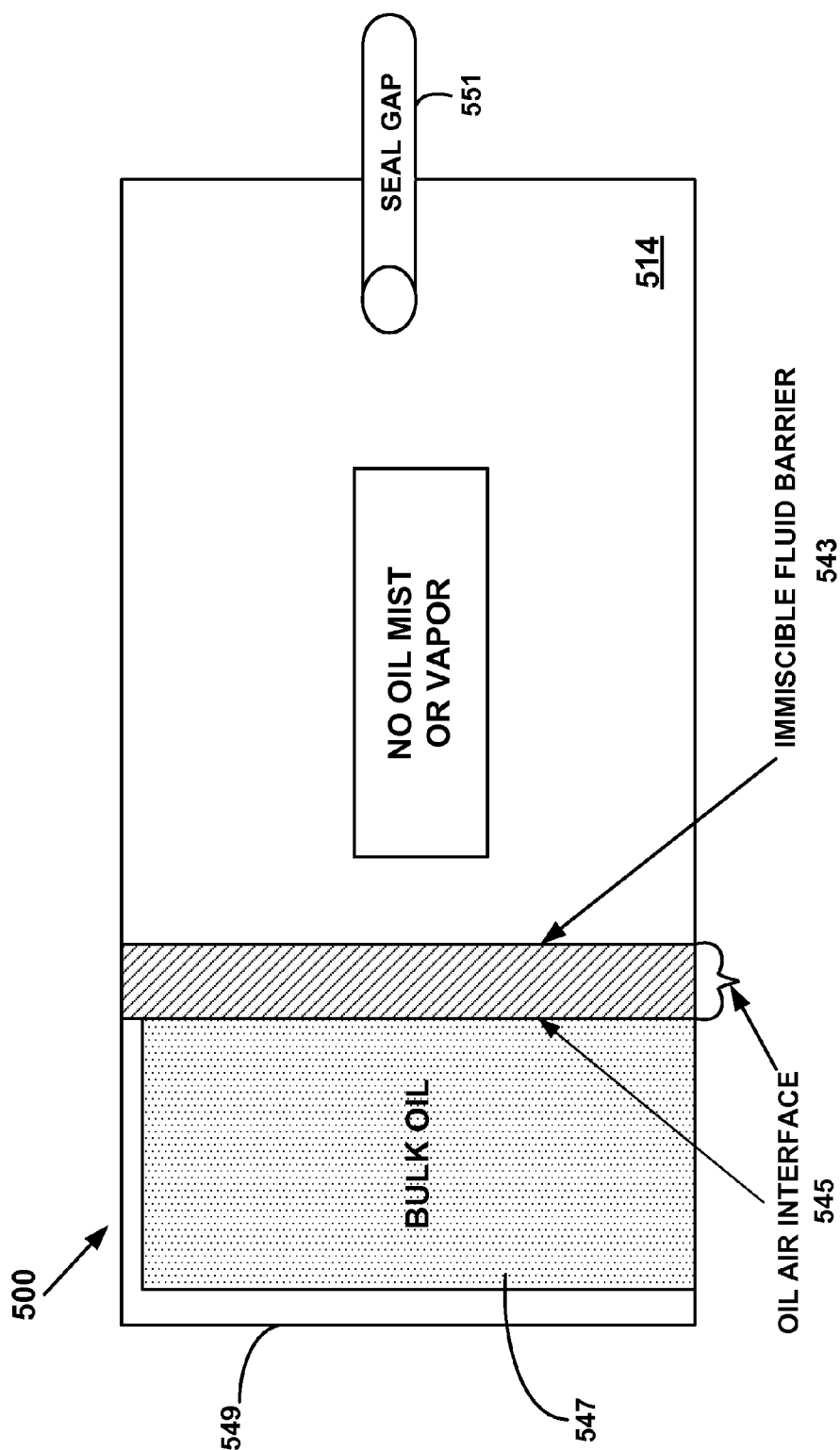
FIG. 5 is a schematic diagram depicting the immiscible fluid barrier on the fluid bearing motor oil showing how they distribute at the oil-air interface in accordance with one embodiment of the present invention.
Figure 6:
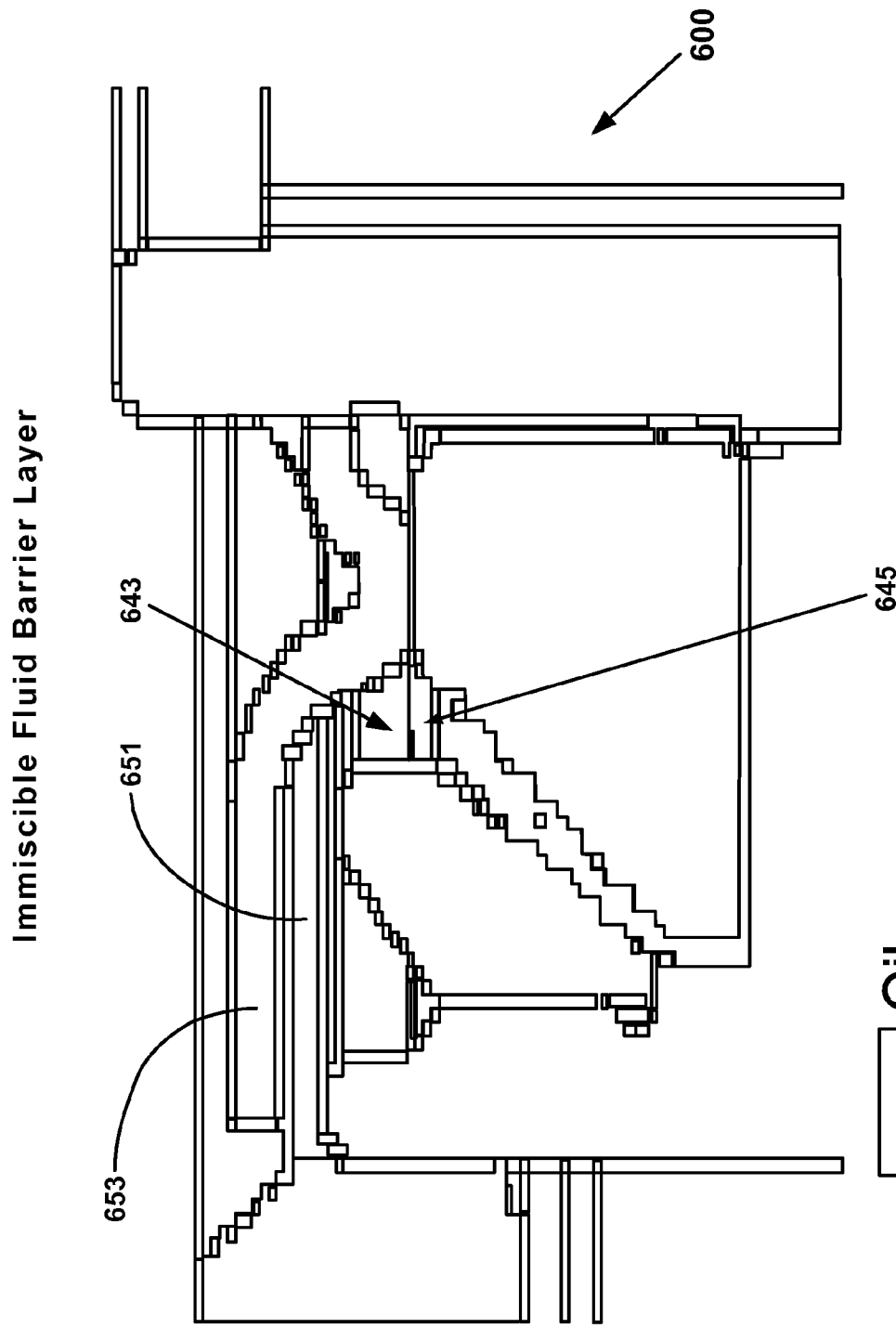
FIG. 6 is a sectional side view of a portion of a disk drive motor fluid dynamic bearing of one embodiment of the present invention.

In general, embodiments of the present invention provide a method and apparatus for forming a fluid dynamic bearing with an immiscible fluid barrier. Referring to FIGS. 4-6, a system, method, and composition for an immiscible fluid that inhibit the passage of oil across the oil-gas interfaces in disk drives and enable the use of the lower viscosity oil in disk drives are disclosed. Mass transfer of oil from the bulk liquid oil into the vapor phase takes place by (1) oil molecules evaporating from the oil-air interface, or (2) collections of oil molecules being ejected from the oil-air interface as aerosol. The invention reduces mass transfer across the oil-air interface through the use of oil-insoluble fluids.

Operation

Figure 1:
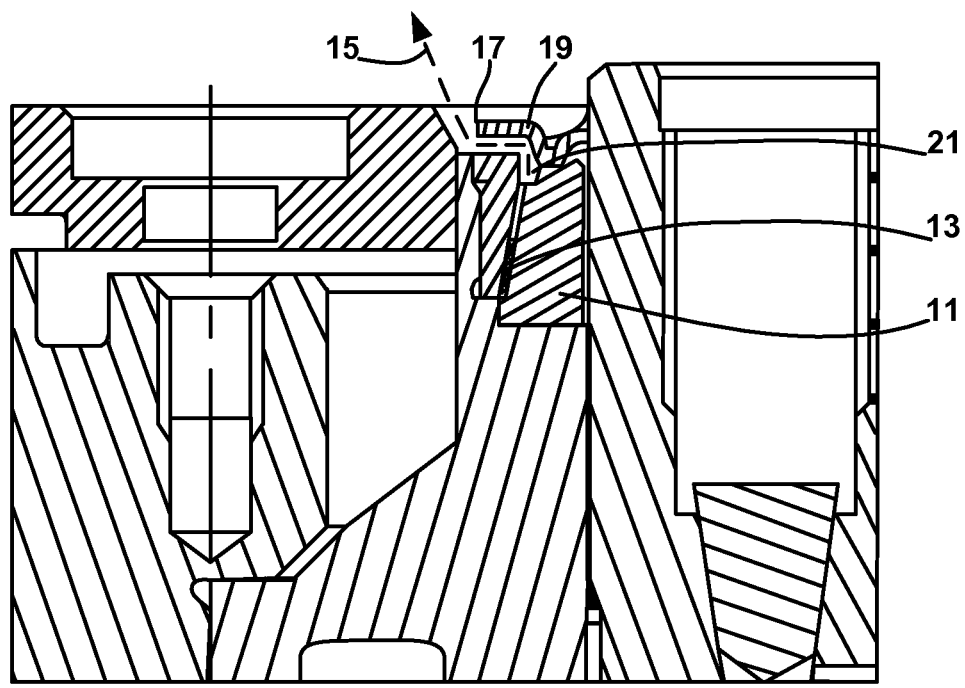
FIG. 1 is a sectional side view of a portion of a conventional disk drive motor fluid dynamic bearing.
Figure 2:
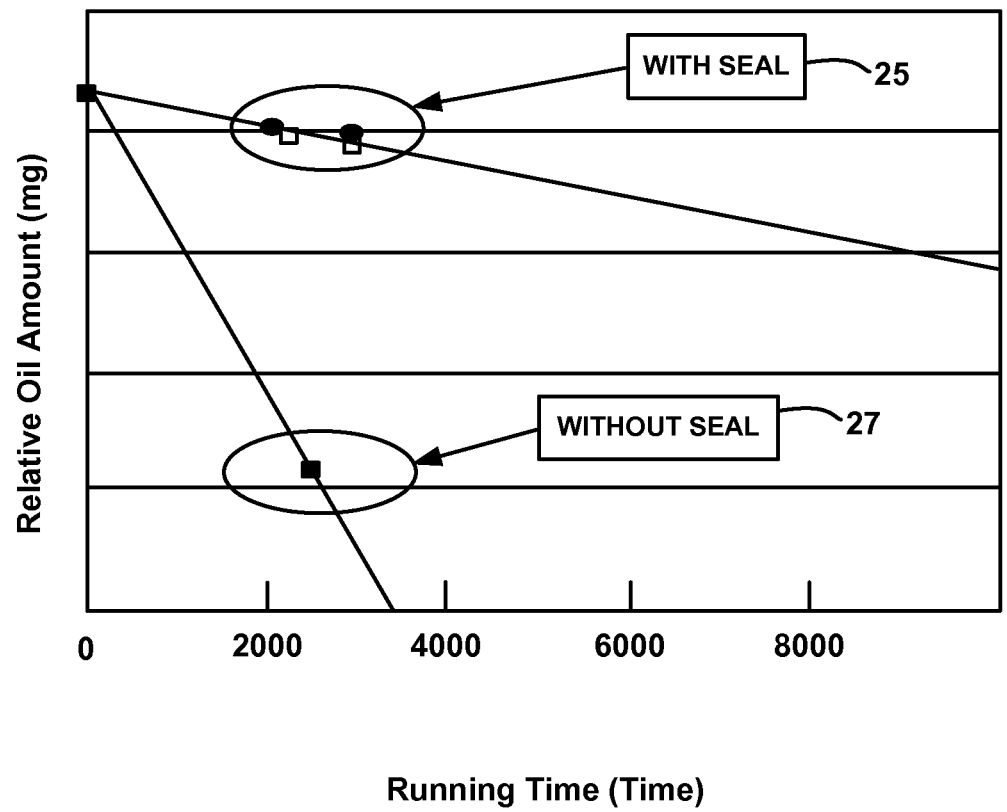
FIG. 2 depicts motor oil levels during testing of various types of conventional disk drives fluid dynamic bearing motors.
Figure 3:
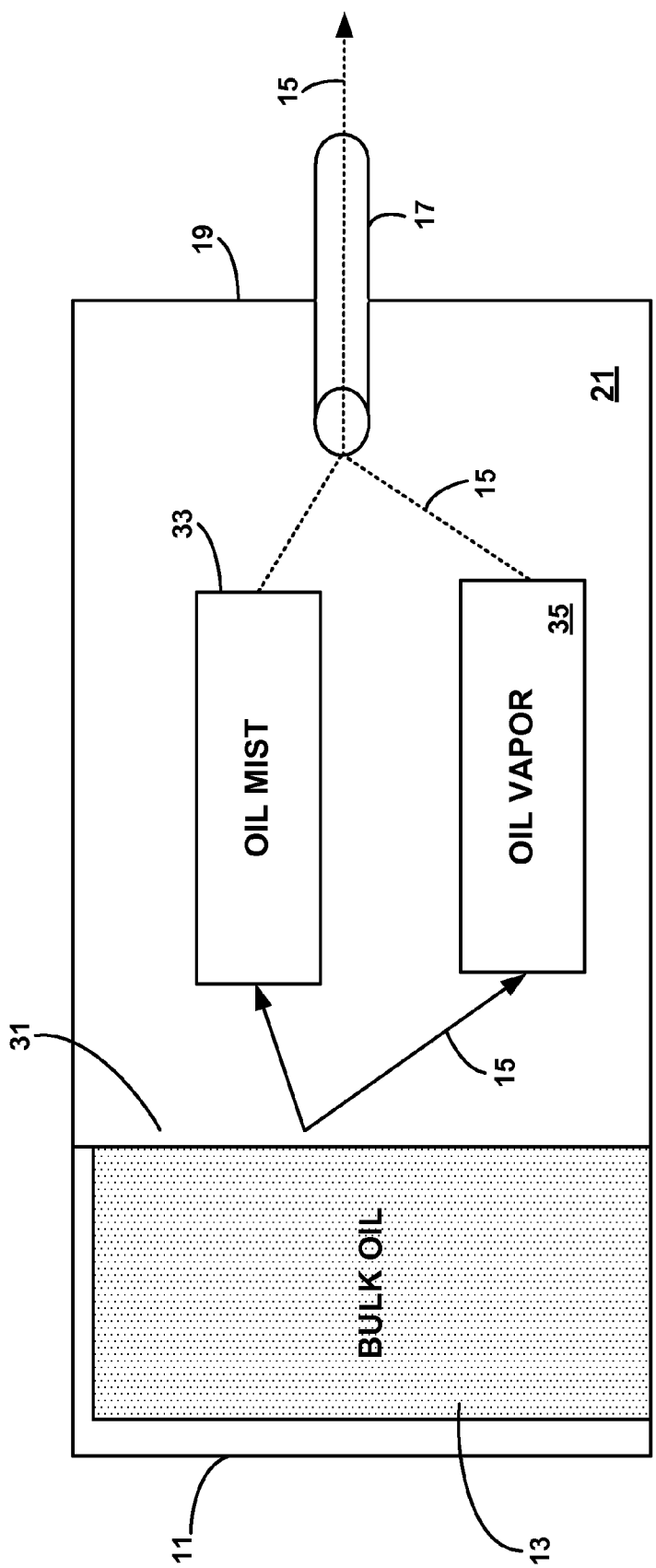
FIG. 3 is a schematic diagram of a conventional disk drive motor bearing oil-air interface.
Figure 4A:
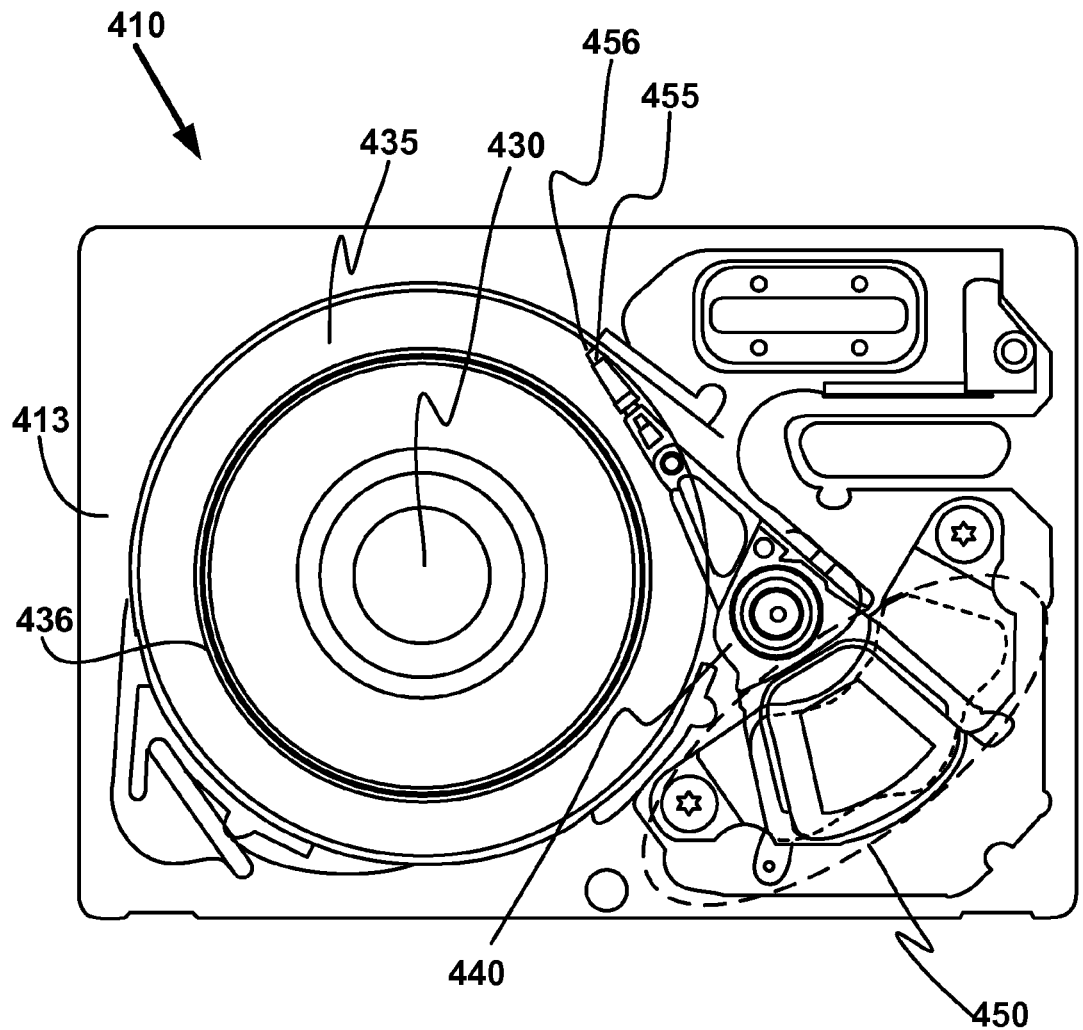
FIG. 4A is a plan view of an HDD with cover and top magnet removed in accordance with one embodiment of the present invention.
Figure 4B:
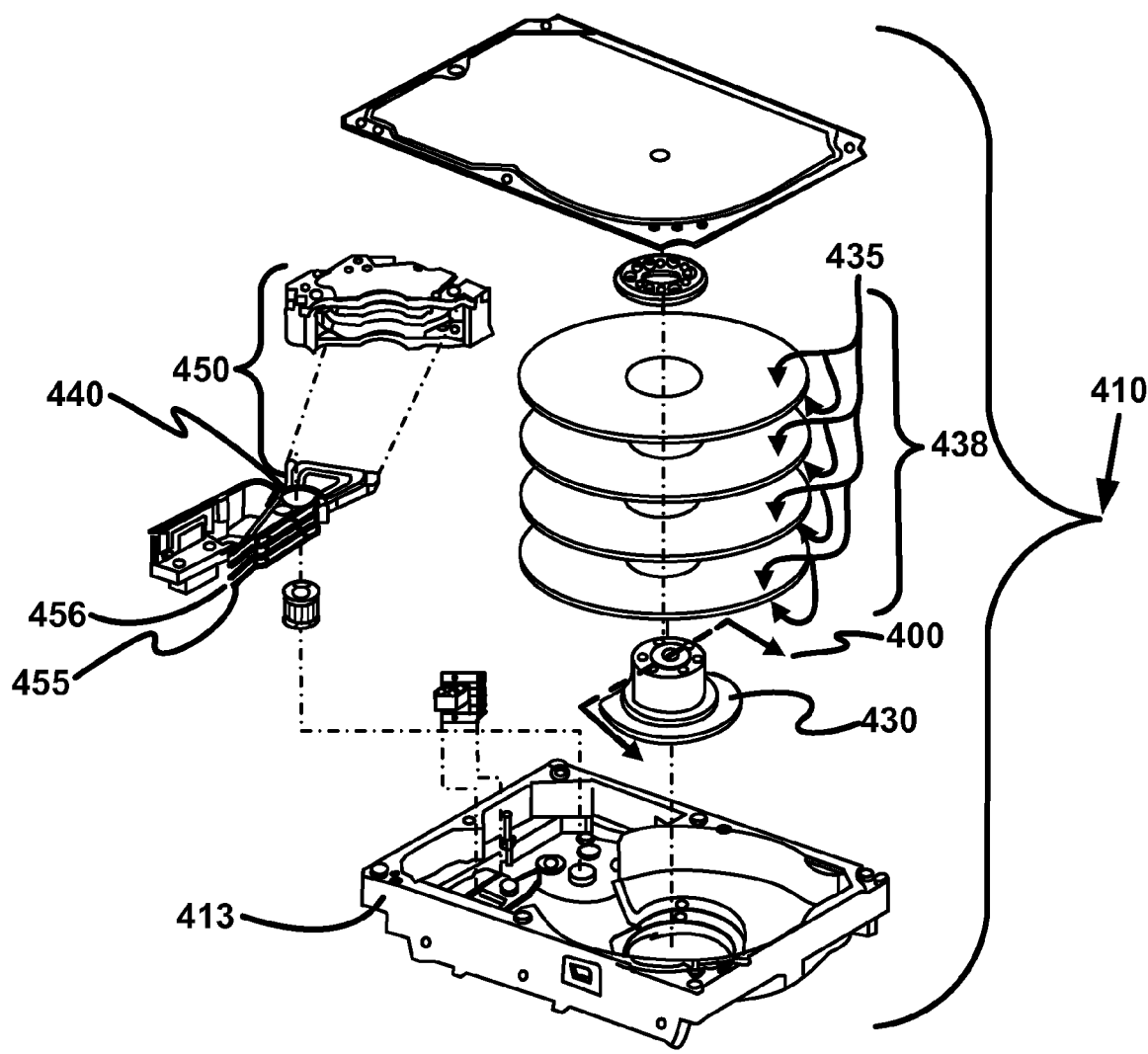
FIG. 4B is an isometric blow-apart of an HDD in accordance with one embodiment of the present invention.

With reference now to FIG. 4A, the relationship of components and sub-assemblies of a hard disk drive (HDD) 410 having a single hard disk drive 438 and a representation of data tracks 436 recorded on disk surface 435 is shown. In general, the cover is removed and not shown so that the inside of HDD 410 is visible. FIG. 4B shows a similar HDD 410, but with all its components in an isometric blow-apart view. The components, such as the plurality of hard disk drives 438, are assembled into base casting 413, which provides attachment and registration points for components and sub-assemblies. Data is recorded onto disk surface 435 in a pattern of concentric rings known as data tracks 436. Disk surface 435 is spun at high speed by means of a motor-hub assembly 430. Data tracks 436 are recorded onto disk surface 435 by means of magnetic head 456, which typically resides at the end of slider 455. FIG. 4A being a plan view shows only one head and one disk surface combination. One skilled in the art understands that what is described may be used for one head-disk combination or a plurality of head-disk combinations. The embodied invention is independent of the number of hard disks in general and the number of head-disk combinations in general.

The dynamic performance of HDD 410 is a major mechanical factor for achieving higher data capacity as well as for manipulating this data faster. The quantity of data tracks 436 recorded on disk surface 435 is determined partly by how well magnetic head 456 and a desired data track 436 can be positioned to each other and made to follow each other in a stable and controlled manner. There are many factors that will influence the ability of HDD 410 to perform the function of positioning magnetic head 456, and following data track 436 with magnetic head 456. In general, these factors can be put into two categories; those factors that influence the motion of magnetic head 456; and those factors that influence the motion of data track 436. Undesirable motions can come about through unwanted vibration and undesirable tolerances of components. Herein, attention is given to motor-hub assembly 430, which attaches to base casting 413, and in particular, attention is given to the fluid dynamic bearing inside motor-hub assembly 430.

With reference now to FIG. 5, a schematic illustration of one embodiment of the immiscible fluid barrier according to one embodiment of the present invention is shown. The embodiment illustrated in FIG. 5 incorporates the effect of the immiscible fluid barrier to prevent evaporation and aerosolization of the fluid bearing oil into oil mist and loss thereof through the seal gap.

The bearing cavity 514 with the immiscible fluid barrier 543 on the oil-air interface 545 prevents oil evaporation and aerosol formation at the oil-air interface 545. Although the interface 545 is described as an "oil-air" interface, one skilled in the art will understand that the invention also is applicable to any suitable oil-gaseous (i.e., oil-gas) interface.

The immiscible fluid barrier 543 inhibits the bulk fluid dynamic bearing oil 547 that is used to lubricate the bearing 549 from forming oil mist and/or vapor, and thereby substantially reduces the risk of oil loss through the seal gap 551 in seal 553.

The effect of this invention is a function of the structure and composition of the immiscible fluid barrier which governs its interaction with the oil 547. Specifically, the immiscible fluid has low vapor pressure and is insoluble in the oil 547. In one embodiment, the immiscible fluid 543 is several hundred microns thick and forms a layer on top of the fluid dynamic bearing oil 547. In one embodiment, the immiscible fluid 543 has significantly higher viscosity than the bearing oil 547. The higher viscosity is acceptable because the shear rate at the top of the capillary buffer is low and the surface area in contact with the rotor and stator of the bearing is much smaller than that of the oil within grooved regions of the bearing. In one embodiment, the immiscible fluid 543 is several molecular layers in thickness.

The layer could range from approximately 50 nm to 500 microns. In one embodiment, the immiscible fluid 543 comprises of non-functional perfluoropolyether fomblin Z02. In another embodiment, the immiscible fluid 543 comprises of non-functional perfluoropolyether fomblin Z15. In yet another embodiment, the immiscible fluid 543 comprises of non-functional perfluoropolyether fomblin Z25. The immiscible fluid 543 may also comprise of a derived narrow molecular weight fraction of perfluoropolyether fomblin which also has a much lower vapor pressure than the fluid dynamic bearing oil 547. Alternatively, the immiscible fluid 543 is Santovac 5, or a low molecular weight polyphenyl ether.

In one embodiment, the immiscible fluid 543 is insoluble in the bearing oil 547 and has low vapor pressure.

With reference now to FIG. 6, a cross-sectional view of a portion of a fluid dynamic bearing 600 is shown in accordance with one embodiment of the present invention. In one exemplary embodiment, the fluid dynamic bearing 600 includes a plurality of components such as a clamp, a bearing cap and a shaft. The rest of the components shown of the FDB are well-known in the art and are not described in greater detail for purposes of brevity and clarity. In one embodiment, the components described in fluid dynamic bearing 600 are mirrored at both ends of the fluid dynamic bearing 600 and are not shown for purposes of brevity and clarity. The bearing cavity 641 with an immiscible fluid barrier film 643 on the oil-air interface 645 prevents oil evaporation and aerosol formation at the oil-air interface 645. Although interface 645 is described as an "oil-air" interface, one skilled in the art will understand that the invention also is applicable to any suitable oil-gaseous (i.e., oil-gas) interface. The immiscible fluid barrier film 643 inhibits the bulk oil 647 that is used to lubricate the bearing 649 from forming oil mist and/or vapor, and thereby significantly reduces or prevents oil loss through the seal gap 651 in seal 653.

Thus, embodiments of the present invention provide a method and apparatus for forming a fluid dynamic bearing with an immiscible fluid barrier. Additionally, embodiments described herein, decrease the evaporation of the bearing oil within the FDB without requiring a modification or change in the viscosity of the fluid in the fluid dynamic bearing. Furthermore, embodiments described herein, provide a fluid dynamic bearing with an immiscible fluid barrier without modifying the manufacturing or structure within the fluid dynamic bearing design.

What is claimed is:

1. A hard disk drive, comprising:
an enclosure; and
a disk rotatably mounted to the enclosure and having magnetic media;
an actuator pivotally mounted to the enclosure and having a transducer for reading data from the magnetic media;
a fluid dynamic bearing that is lubricated with bearing oil and a seal for retaining the oil, the seal having a seal gap; and
a barrier comprising a bearing-oil-immiscible fluid disposed as a homogeneous layer only comprising said bearing-oil-immiscible fluid on top of the bearing oil for preventing the bearing oil from leaking through the seal gap, such that only said bearing-oil-immiscible fluid of said barrier is in contact with said seal gap.

2. The hard disk drive of claim 1, wherein the bearing-oil-immiscible fluid has lower vapor pressure than the bearing oil.

3. The hard disk drive of claim 1, wherein the bearing oil is an ester oil.

4. The hard disk drive of claim 1, wherein the bearing-oil-immiscible fluid is a perfluoropolyether.

5. The hard disk drive of claim 1, wherein the bearing-oil-immiscible fluid is a polyaromatic.

6. The hard disk drive of claim 5, wherein the polyaromatic is Santovac 5.

7. The hard disk drive of claim 1, wherein the bearing-oil-immiscible fluid is polyphenylene oxide.

8. The hard disk drive of claim 1, wherein the bearing-oil-immiscible fluid is in a range of approximately 50 nm to 500 microns thick.

9. The hard disk drive of claim 1, wherein the bearing-oil-immiscible fluid has a higher viscosity than the bearing oil.

10. The hard disk drive of claim 1, wherein the bearing-oil-immiscible fluid is insoluble in the bearing oil.

11. A data storage device, comprising:
a housing;
at least one disk mounted to the housing and rotatable relative to the housing;
an actuator mounted to the housing and being movable relative to the disk, the actuator having a suspension for reaching over the disk, the suspension having a slider coupled therewith, the slider having a read/write head element on a trailing edge (TE) portion of the slider;
a fluid dynamic bearing having bearing oil; and
a seal cap adjacent to a shaft of the fluid dynamic bearing, the seal cap having an outside end proximal such that an air-gap is provided between the outside end of the cap to define a bearing cavity; and
a barrier comprising a bearing-oil-immiscible fluid disposed as a homogeneous layer only comprising said bearing-oil-immiscible fluid on top of the bearing oil to prohibit the bearing oil from evaporating from the bearing cavity, such that only said bearing-oil-immiscible fluid of said barrier is in contact with said seal gap.

12. The data storage device of claim 11, wherein the bearing-oil-immiscible fluid is coated on an oil air interface in the bearing cavity.

13. The data storage device of claim 11, wherein the bearing-oil-immiscible fluid is a low vapor pressure liquid.

14. The data storage device of claim 11, wherein the air-gap is a horizontal opening between the outside end of the cap and a rotor.

15. The data storage device of claim 11, wherein the bearing-oil-immiscible fluid is a perfluoropolyether.

16. The data storage device of claim 11, wherein the bearing oil is an ester oil.

17. The data storage device of claim 11, wherein the bearing-oil-immiscible fluid is a polyaromatic.

18. A fluid dynamic bearing, comprising:
 a seal gap to a fluid dynamic bearing, the seal gap for preventing oil leakage in the fluid dynamic bearing;
 bearing oil for lubricating a drive hub in the fluid dynamic bearing; and
 a barrier comprising a bearing-oil-immiscible fluid disposed as a homogeneous layer only comprising said bearing-oil-immiscible fluid on top of the bearing oil for prohibiting evaporation of the bearing oil through the seal gap, such that only said bearing-oil-immiscible fluid of said barrier is in contact with said seal gap.

19. The fluid dynamic bearing of claim 18, wherein the bearing oil is ester oil.

20. The fluid dynamic bearing of claim 18, wherein the bearing-oil-immiscible fluid is insoluble in the bearing oil.

21. The fluid dynamic bearing of claim 18, wherein the bearing-oil-immiscible fluid is polyphenylene oxide.

22. The fluid dynamic bearing of claim 18, wherein the bearing-oil-immiscible fluid is a non-functional perfluoropolyether.

23. The fluid dynamic bearing of claim 18, wherein the bearing-oil-immiscible fluid is approximately 50 nm to 500 microns thick.

24. The fluid dynamic bearing of claim 18, wherein the bearing-oil-immiscible fluid is a high viscosity fluid.

25. The fluid dynamic bearing of claim 18, wherein a viscosity of the bearing-oil-immiscible fluid is higher than that of the bearing oil.

* * * * *